(12) United States Patent
Yan et al.

(10) Patent No.: US 7,211,016 B2
(45) Date of Patent: May 1, 2007

(54) GEARED MOTOR WITH PLANETARY GEAR ASSEMBLY

(75) Inventors: Hong-Sen Yan, Tainan (TW); Yi-Chang Wu, Tainan (TW)

(73) Assignee: National Cheng Kung University, Tainan (TW)

( * ) Notice: Subject to any disclaimer, the term of this patent is extended or adjusted under 35 U.S.C. 154(b) by 140 days.

(21) Appl. No.: 11/071,283

(22) Filed: Mar. 4, 2005

(65) Prior Publication Data

US 2006/0111214 A1 May 25, 2006

(30) Foreign Application Priority Data

Nov. 22, 2004 (TW) .............. 93135845 A

(51) Int. Cl.
*F16H 3/72* (2006.01)

(52) U.S. Cl. .................. 475/5; 475/219; 475/903

(58) Field of Classification Search .............. 475/5, 475/219, 317, 903; 180/65.1
See application file for complete search history.

(56) References Cited

U.S. PATENT DOCUMENTS

| | | | |
|---|---|---|---|
| 4,467,231 A * | 8/1984 | Biglino ............... 310/154.17 |
| 4,763,031 A * | 8/1988 | Wang .................... 310/83 |
| 4,828,049 A * | 5/1989 | Preis .................... 173/217 |
| 4,862,009 A * | 8/1989 | King .................... 290/22 |
| 5,196,747 A * | 3/1993 | Kress et al. ............ 310/89 |
| 5,624,000 A * | 4/1997 | Miller ................... 173/216 |
| 5,834,852 A * | 11/1998 | Katoh et al. ........... 290/38 R |
| 6,484,834 B2 * | 11/2002 | Bowen et al. .......... 180/65.6 |
| 7,090,030 B2 * | 8/2006 | Miller ................... 173/2 |
| 2002/0185290 A1 * | 12/2002 | Tang .................... 173/216 |
| 2006/0030445 A1 * | 2/2006 | Zheng et al. .......... 475/5 |

* cited by examiner

*Primary Examiner*—David D. Le
(74) *Attorney, Agent, or Firm*—Foley & Lardner LLP

(57) ABSTRACT

A geared motor includes a rotor mounted rotatably to a motor housing and having an output shaft along a rotating axis, and a stator secured to the motor housing to surround the rotor. The stator has a plurality of angularly displaced core segments with wall areas confronting magnetic pole units on the rotor, and a plurality of windings wound respectively around the core segments to create a torque so as to drive the output shaft. A planetary gear assembly includes a sun wheel mounted on the output shaft, an annulus secured to the motor housing and having an internally toothed annular surface, and a planet wheel meshing with the toothed surface and the sun wheel. A rotary member is rotated by a speed reduction drive transmitted from the planet wheel about a transmitting axis aligned with the rotating axis.

7 Claims, 4 Drawing Sheets

GEARED MOTOR WITH PLANETARY GEAR ASSEMBLY

CROSS-REFERENCE TO RELATED APPLICATION

This application claims priority of Taiwanese Application No. 093135845, filed on Nov. 22, 2004.

BACKGROUND OF THE INVENTION

1. Field of the Invention

This invention relates to a geared motor, more particularly to a geared motor, such as a brushless DC motor with a planetary gear assembly mounted thereon.

2. Description of the Related Art

A conventional motor with a speed reduction device generally employs a coupler or a power-transmitting mechanism to couple an output shaft of the motor with an input rotating shaft of the speed reduction device so as to deliver a speed reduction drive. As the motion and/or power is transmitted from the motor to the speed reduction device through the coupler or the power-transmitting mechanism, mechanical loss will result due to friction. Moreover, since the conventional motor and the speed reduction device are designed and fabricated independently, and are assembled together with other power-transmitting elements, mechanism support frames, and corresponding fasteners, the resultant assembly has a large number of components, which not only increases manufacturing and maintenance costs but also affects the working precision of the assembly. In addition, the assembly as a whole is bulky.

SUMMARY OF THE INVENTION

The object of the present invention is to provide a geared motor that integrates a stator, a rotor and a planetary gear assembly in a motor housing so as to have a fewer number of components, thereby reducing the manufacturing and maintenance costs, and that generates relatively small cogging torque and torque ripple, thereby increasing operational steadiness and lowering the acoustic noise and vibration generated during operation.

According to this invention, the geared motor includes a motor housing, a rotor, a stator, and a planetary gear assembly. The rotor includes a rotor body mounted on and rotatable relative to the motor housing about a rotating axis, an output shaft extending from the rotor body along the rotating axis, and a plurality of magnetic pole units which are disposed on the rotor body, which are angularly displaced from one another about the rotating axis, and which respectively face radially and outwardly. The stator is secured to the motor housing, and is disposed to surround the rotor. The stator includes a plurality of core segments having a plurality of wall areas, respectively, which are angularly displaced from one another about the rotating axis, and which respectively confront the magnetic pole units, and a plurality of windings which are respectively disposed radially and outwardly of the wall areas, and which are respectively wound around the core segments such that the magnetic fields induced thereby interact with those of the magnetic pole units to create a torque, thereby driving the output shaft to rotate about the rotating axis. The planetary gear assembly includes a sun wheel mounted on and rotated with the output shaft, an annulus which is secured to the motor housing, and which has an internally toothed annular surface spaced from the sun wheel in radial directions, and a planet wheel with a planet axis. The planet wheel meshes with the internally toothed annular surface and the sun wheel. A rotary member is disposed to be rotatable about a transmitting axis which is aligned with the rotating axis, and includes an input-side wall and an output-side wall opposite to each other along the transmitting axis. A coupling pin is disposed on the input-side wall, and is brought into engagement with the planet wheel along the planet axis so as to transmit the drive of the planet wheel to thereby rotate the rotary member about the transmitting axis. An output coupling member is disposed on the output-side wall such that the output coupling member is rotated with the rotary member about the transmitting axis so as to deliver a speed reduction drive.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
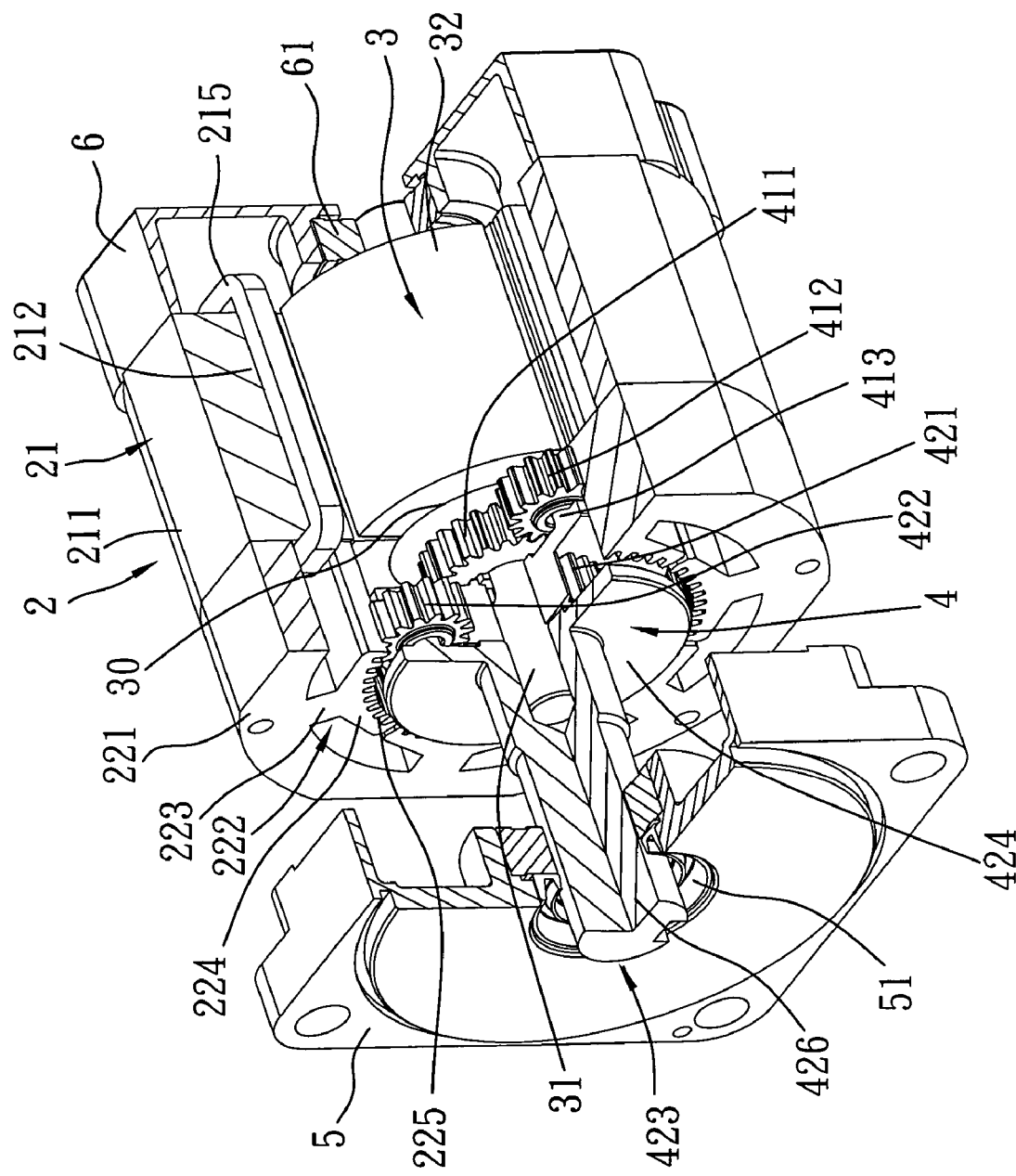
FIG. 1 is a fragmentary perspective view of the preferred embodiment of a geared motor according to this invention.
Figure 2:
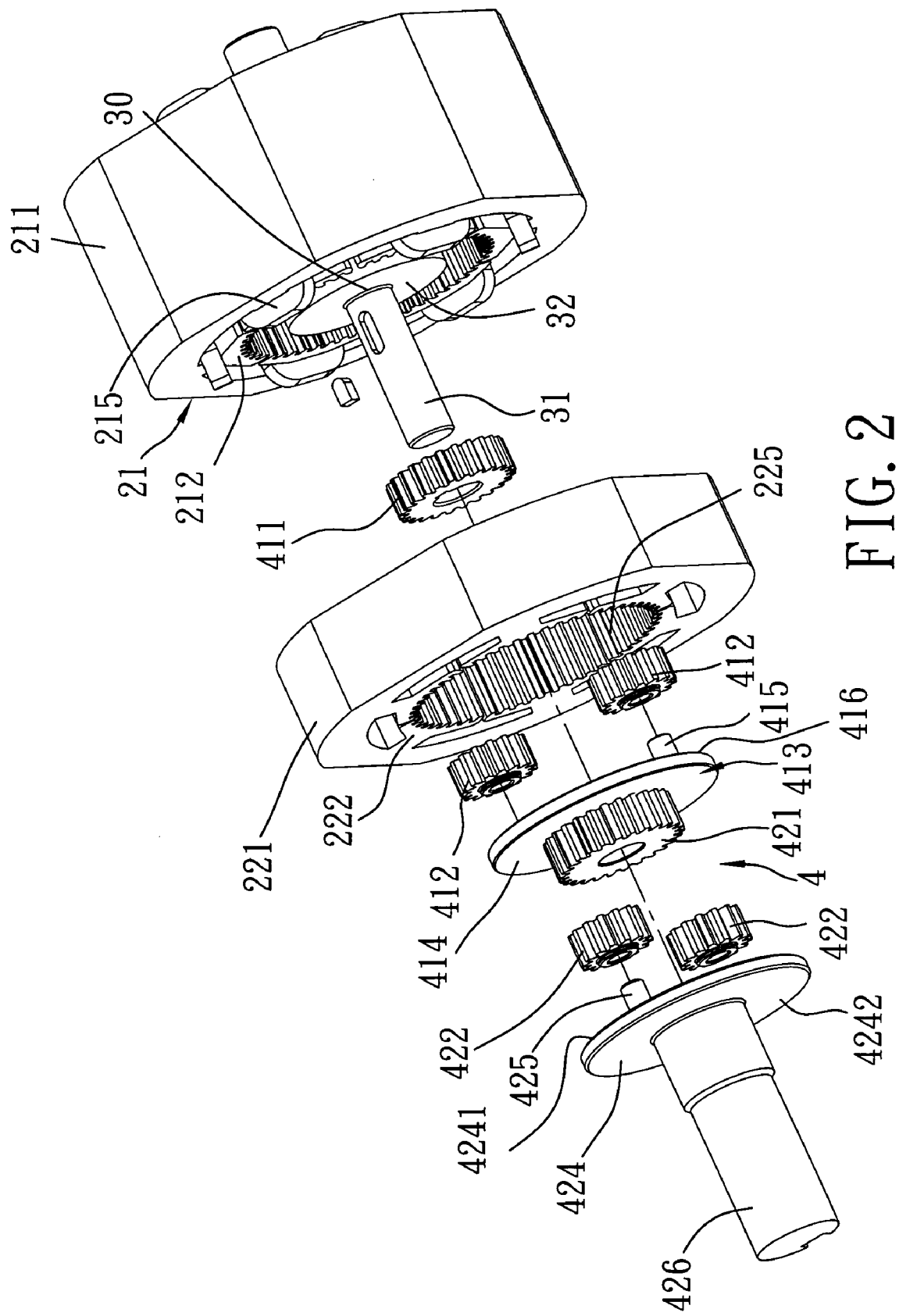
FIG. 2 is an exploded perspective view of the preferred embodiment.
Figure 3:
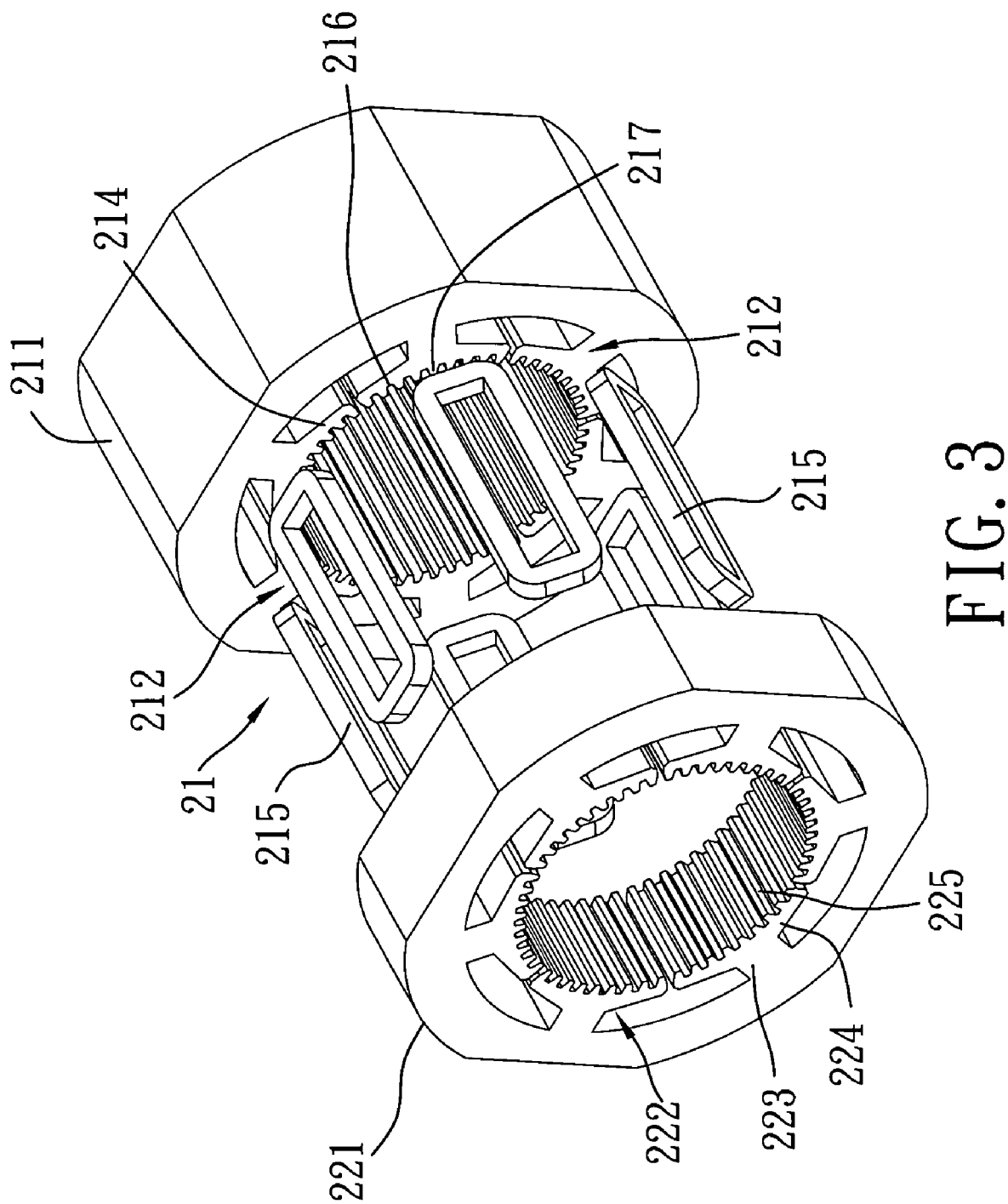
FIG. 3 is an exploded perspective view of the preferred embodiment, a planetary gear assembly thereof being removed for the sake of clarity.

Referring to FIGS. 1 to 3, the preferred embodiment of a geared motor according to the present invention is shown to comprise a motor housing 2, a rotor 3, a stator 21, and a planetary gear assembly 4.

The motor housing 2 includes front and rear annular shells 221, 211 which are aligned and juxtaposed with each other in an axial direction and which surround a rotating axis in the axial direction, and front and rear covers 5, 6 which are respectively secured to the front and rear annular shells 221, 211 and which are disposed opposite to each other in the axial direction.

The rotor 3 includes a rotor body 30 which is mounted on and which is rotatable relative to the motor housing 2 about the rotating axis, an output shaft 31 which extends from the rotor body 30 along the rotating axis and which is journalled on the rear cover 6 through an anti-friction bearing 61 disposed thereon, and a plurality of magnetic pole units 32, such as four permanent magnets, which are disposed on the rotor body 30, which are angularly displaced from one another about the rotating axis, and which face radially and outwardly.

Figure 4:
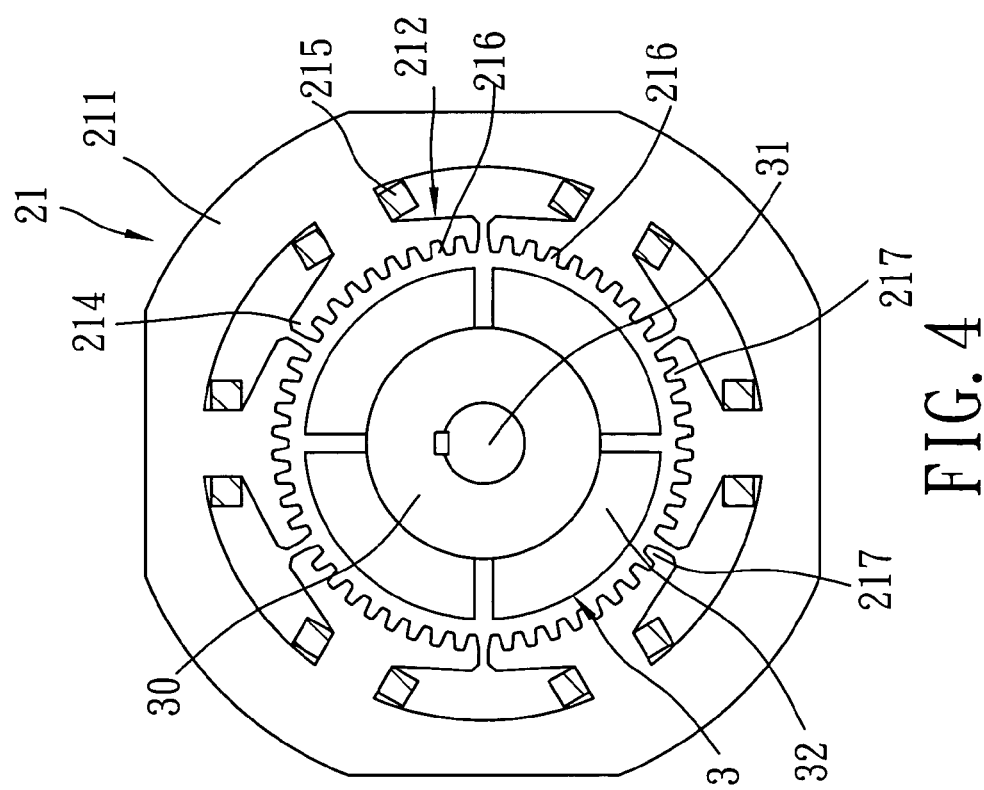
FIG. 4 is a sectional view showing a stator and a rotor of the preferred embodiment.

With reference to FIG. 4, the stator 21 is disposed to surround the rotor 3, and includes a plurality of core segments 212 which are formed integrally with and which extend radially and inwardly from the rear annular shell 211 and which terminate at a plurality of wall areas 214, respectively. The wall areas 214 are angularly displaced from one another about the rotating axis, and respectively confront the magnetic pole units 32. In this embodiment, the core segments 212 and the rear annular shell 211 are made by punching magnetic steel plates. A plurality of windings 215 are respectively wound around the core segments 212, and are respectively disposed radially and outwardly of the wall areas 214 such that the magnetic fields induced thereby interact with those of the magnetic pole units 32 to create a torque, thereby driving the output shaft 31 to rotate about the rotating axis. In addition, each of the wall areas 214 has a plurality of ribs 217 which extend in the axial direction and in radial directions relative to the rotating axis so as to form a plurality of dummy slots 216 thereamong so as to vary the energy stored in the air gap as the rotor 3 rotates, thereby reducing the cogging torque of the geared motor.

Figure 5:
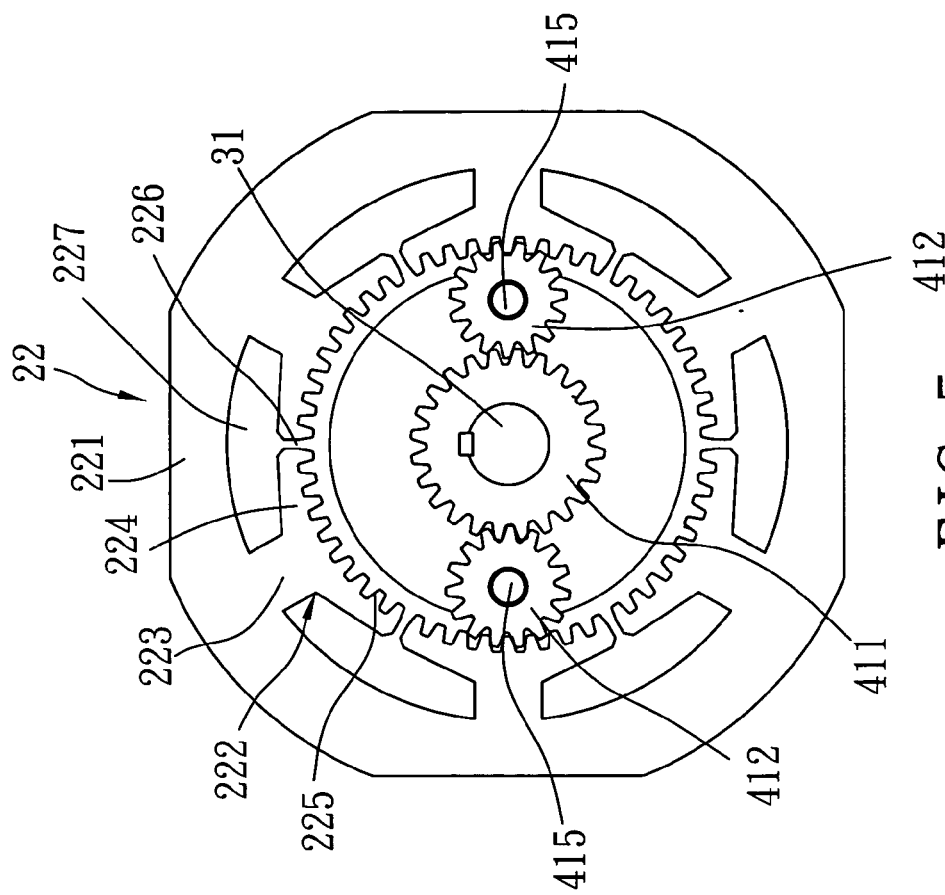
FIG. 5 is a sectional view showing a portion of the planetary gear assembly of the preferred embodiment.

With reference to FIGS. 3 and 5, the planetary gear assembly 4 includes a sun wheel 411 which is mounted on and which is rotated with the output shaft 31 of the rotor 3. An annulus 222 includes a plurality of support segments 223 which are formed integrally with and which extend radially and inwardly from the front annular shell 221, which terminate at a plurality of arcuate toothed surface regions 224, respectively, and which are angularly displaced from one another about the rotating axis by a plurality of clearances 226. Two adjacent ones of the support segments 223 define therebetween an insertion slot 227, which is communicated with the respective clearance 226. The arcuate toothed surface regions 224 cooperate with one another to serve as an internally toothed annular surface 225 which is spaced from the sun wheel 411 in the radial directions. The annulus 222 and the front annular shell 221 are made by punching steel plates, and have the same configuration as the core segments 212 and the rear annular shell 211 by employing the identical punching die. When the front and rear annular shells 221, 211 are juxtaposed with each other in such a manner that the core segments 212 and the support segments 223 are alternately arranged, an insertion end of each winding 215 extends axially and forwardly of the rear annular shell 211 and into the respective insertion slot 227. In this embodiment, the geared motor is a three-phase motor, and has six core segments 212 and six windings 215. Alternatively, the geared motor may be a two-phase motor or any other suitable motor.

Furthermore, the number of teeth on the internally toothed annular surface 225 is a multiple of the number of the core segments 212. In this embodiment, the number of the support segments 223 is six, and each of the support segments 223 has nine teeth. Therefore, the number of teeth on the internally toothed annular surface 225 is fifty-four.

The planetary gear assembly 4 further includes first and second planet wheels 412 which respectively have first and second planet axes that are diametrical to each other relative to the rotating axis, and which respectively mesh with both the internally toothed annular surface 225 and the sun wheel 411. A rotary member 413 is disposed to be rotatable about a transmitting axis which is aligned with the rotating axis, and includes an input-side wall 416 and an output-side wall 414 which are opposite to each other along the transmitting axis, and which are proximate to and distal from the first and second planet wheels 412, respectively. First and second coupling pins 415 are disposed on the input-side wall 416, and are diametrical to each other relative to the transmitting axis such that the first and second coupling pins 415 are brought into engagement with the first and second planet wheels 412 along the first and second planet axes so as to steadily transmit the drive of the first and second planet wheels 412 to thereby rotate the rotary member 413 about the transmitting axis.

An output coupling member 421 is disposed on the output-side wall 414 of the rotary member 413 such that the output coupling member 421 is rotated with the rotary member 413 about the transmitting axis so as to deliver a speed reduction drive.

In order to permit the delivering of a further speed reduction drive, the output coupling member 421 in this embodiment is in the form of a sun wheel. Furthermore, an output rotating member 424 is disposed to be rotatable about the transmitting axis, and includes inside and outside walls 4241, 4242 proximate to and distal from the output coupling member 421, respectively. Third and fourth planet wheels 422 have third and fourth planet axes that are parallel to the transmitting axis, are disposed between the inside wall 4241 and the output-side wall 414, and respectively mesh with both the internally toothed annular surface 225 and the output coupling member 424. Third and fourth coupling pins 425 are disposed on the inside wall 4241 of the output rotating member 424, and are in engagement with the third and fourth planet wheels 422, respectively, along the third and fourth planet axes so as to respectively transmit the drive of the third and fourth planet wheels 422 to thereby rotate the output rotating member 424 about the transmitting axis. An output rotating shaft 426 is disposed on the outside wall 4242 so as to be rotated with the output rotating member 424 about the transmitting axis. The output rotating shaft 426 is journalled on the front cover 6 by an anti-friction bearing 51 disposed thereon. The output rotating shaft 426 may be tubular at one end such that the output shaft 31 is disposed in and is supported by the tubular end. In this embodiment, the number of teeth of the sun wheel 522 is twenty-four; the number of teeth of each of the first and second planet wheels 412 is fifteen; the number of teeth of the output coupling member 421 is twenty-six; and the number of teeth of each of the third and fourth planet wheels 422 is fourteen. Therefore, the reduction ratio is 1:10.

As illustrated, the planetary gear assembly 4 and the rotor 3 are mounted in the motor housing 2 to couple the output shaft 31 of the rotor 3 with the output rotating shaft 426 without the need to use any additional coupler, speed reduction mechanism support frame, or corresponding fasteners, thereby reducing the manufacturing cost and rendering the geared motor compact and relatively light. In addition, the length of the geared motor in the axial direction can be shortened. Besides, since the rotor 3, the stator 21, the planetary gear assembly 4, and the output rotating shaft 426 are mounted coaxially, the drive transmitted from the output shaft 31 to the output rotating shaft 426 is steady, and mechanical loss due to friction can be minimized.

Furthermore, due to the construction of the stator 21 and the provision of the ribs 217 and dummy slots 216, the cogging torque and the torque ripple generated on the geared motor can be reduced, thereby increasing the operational steadiness of the geared motor and lowering the acoustic noise and vibration generated during operation.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. A geared motor, comprising:
   a motor housing;
   a rotor including
      a rotor body mounted on, and rotatable relative to said motor housing about a rotating axis, an output shaft extending from said rotor body along the rotating axis, and a plurality of magnetic pole units which are disposed on said rotor body, which are angularly displaced from one another about the rotating axis, and which respectively face radially and outwardly;

a stator which is secured to said motor housing, and which is disposed to surround said rotor, said stator including a plurality of core segments having a plurality of wall areas, respectively, which are angularly displaced from one another about the rotating axis, and which respectively confront said magnetic pole units, and a plurality of windings which are respectively disposed radially and outwardly of said wall areas, and which are respectively wound around said core segments such that the magnetic fields induced thereby interact with those of said magnetic pole units to create a torque, thereby driving said output shaft to rotate about the rotating axis;

a planetary gear assembly including a sun wheel mounted on and rotated with said output shaft, an annulus which is secured to said motor housing, and which has an internally toothed annular surface spaced from said sun wheel in radial directions, and a first planet wheel with a first planet axis, said first planet wheel meshing with said internally toothed annular surface and said sun wheel;

a rotary member disposed to be rotatable about a transmitting axis which is aligned with the rotating axis, said rotary member including an input-side wall and an output-side wall which are opposite to each other along the transmitting axis, and which are proximate to and distal from said first planet wheel, respectively;

a first coupling pin which is disposed on said input-side wall, and which is brought into engagement with said first planet wheel along the first planet axis so as to transmit the drive of said first planet wheel to thereby rotate said rotary member about the transmitting axis; and an output coupling member disposed on said output-side wall such that said output coupling member is rotated with said rotary member about the transmitting axis so as to deliver a speed reduction drive; wherein said motor housing includes front and rear annular shells which are aligned and juxtaposed with each other in an axial direction parallel to the rotating axis and which surround the rotating axis, said core segments of said stator being formed integrally with and extending radially and inwardly from said rear annular shell, and terminating at said wall areas, respectively, said annulus including a plurality of support segments which are angularly displaced from one another about the rotating axis by a plurality of clearances, which are formed integrally with and which extend radially and inwardly from said front annular shell, and which respectively terminate at a plurality of arcuate toothed surface regions that cooperate with one another to serve as said internally toothed annular surface.

2. The geared motor of claim 1, wherein each of said wall areas has a plurality of ribs extending in the axial direction and in radial directions relative to the rotating axis so as to reduce cogging torque of said geared motor.

3. The geared motor of claim 1, wherein said motor housing further includes front and rear covers which are respectively secured to said front and rear annular shells and which are disposed opposite to each other in the axial direction so as to journal said output coupling member and said output shaft of said rotor, respectively.

4. The geared motor of claim 1, wherein two adjacent ones of said support segments define therebetween an insertion slot which is communicated with a respective one of said clearances.

5. The geared motor of claim 4, wherein each of said windings has an insertion end which extends axially and forwardly of said rear annular shell, said core segments and said support segments being arranged such that said insertion end extends in said insertion slot.

6. The geared motor of claim 1, wherein said planetary gear assembly further includes a second planet wheel with a second planet axis which is diametrical to the first planet axis relative to the rotating axis, said second planet wheel meshing with said internally toothed annular surface and said sun wheel; and a second coupling pin which is disposed on said input-side wall, and which is disposed diametrically opposite to said first coupling pin relative to the transmitting axis such that said second coupling pin is brought into engagement with said second planet wheel along the second planet axis so as to steadily transmit the drive of said first and second planet wheels.

7. The geared motor of claim 6, wherein said output coupling member is in the form of a sun wheel, said geared motor further comprising:

an output rotating member which is disposed to be rotatable about the transmitting axis, and which includes inside and outside walls proximate to and distal from said output coupling member, respectively;

a third planet wheel with a third planet axis parallel to the transmitting axis, said third planet wheel being disposed between said inside wall and said output-side wall, and meshing with said internally toothed annular surface and said output coupling member;

a third coupling pin which is disposed on said inside wall of said output rotating member, and which is in engagement with said third planet wheel along the third planet axis so as to transmit the drive of said third planet wheel to thereby rotate said output rotating member about the transmitting axis; and an output rotating shaft which is disposed on said outside wall so as to be rotated with said output rotating member about the transmitting axis to thereby deliver a further speed reduction drive.

* * * * *